(12) United States Patent
Joshi et al.

(10) Patent No.: US 9,690,870 B2
(45) Date of Patent: Jun. 27, 2017

(54) EMAIL TAGS

(75) Inventors: Parag M. Joshi, Los Gatos, CA (US); Claudio Bartolini, Palo Alto, CA (US); Sven Graupner, Mountain View, CA (US); Hamid Reza Motahari Nezhad, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 14/354,802

(22) PCT Filed: Oct. 31, 2011

(86) PCT No.: PCT/US2011/058655
§ 371 (c)(1),
(2), (4) Date: Apr. 28, 2014

(87) PCT Pub. No.: WO2013/066302
PCT Pub. Date: May 10, 2013

(65) Prior Publication Data
US 2014/0289258 A1    Sep. 25, 2014

(51) Int. Cl.
G06F 17/30 (2006.01)
G06Q 10/10 (2012.01)
H04L 12/58 (2006.01)

(52) U.S. Cl.
CPC ..... *G06F 17/30946* (2013.01); *G06Q 10/107* (2013.01); *H04L 51/12* (2013.01)

(58) Field of Classification Search
CPC ................................................ G06F 17/30011
See application file for complete search history.

(56) References Cited

U.S. PATENT DOCUMENTS

| | | | |
|---|---|---|---|
| 6,092,101 A | 7/2000 | Birrell et al. | |
| 6,161,130 A | 12/2000 | Horvitz et al. | |
| 8,713,124 B1 * | 4/2014 | Weiss | G06Q 10/107 709/205 |
| 2002/0073313 A1 * | 6/2002 | Brown | G06F 21/62 713/165 |
| 2002/0099941 A1 * | 7/2002 | Tanimoto | H04L 63/0435 713/168 |
| 2004/0078596 A1 * | 4/2004 | Kent, Jr. | G06Q 10/107 713/160 |

(Continued)

FOREIGN PATENT DOCUMENTS

| | | |
|---|---|---|
| CN | 101247357 A | 8/2008 |
| JP | 2007-173978 | 7/2007 |

(Continued)

OTHER PUBLICATIONS

International Search Report, PCT/US2011/058655, Apr. 26, 2012, 9 pages.

(Continued)

*Primary Examiner* — Tarek Chbouki

(57) ABSTRACT

Suggesting email tags. A non-transitory machine-readable storage device includes executable instructions that, when executed, cause one or more processors to provide a suggestion for at least one suggested tag based on content of an email, receive a selection of a selected tag, store the email in a computer database, thus creating a stored email, and associate the selected tag with the stored email in the computer database.

17 Claims, 4 Drawing Sheets

(56) References Cited

U.S. PATENT DOCUMENTS

| | | |
|---|---|---|
| 2007/0192275 A1 | 8/2007 | Foygel et al. |
| 2008/0147818 A1* | 6/2008 | Sabo .................. G06Q 10/00 709/206 |
| 2009/0144636 A1* | 6/2009 | Beynon ............... G06Q 10/107 715/752 |
| 2009/0228807 A1* | 9/2009 | Lemay ................ G06Q 10/107 715/752 |
| 2010/0030798 A1 | 2/2010 | Kumar et al. |
| 2010/0036856 A1* | 2/2010 | Portilla ............... H04L 12/5885 |
| 2010/0064231 A1* | 3/2010 | Gupta ................... H04L 12/58 715/748 |
| 2010/0094859 A1 | 4/2010 | Gupta |
| 2010/0161505 A1 | 6/2010 | Ding et al. |
| 2010/0293058 A1* | 11/2010 | Maher ............... G06F 17/30699 705/14.66 |
| 2011/0013799 A1 | 1/2011 | Fang et al. |
| 2011/0087743 A1* | 4/2011 | Deluca ................ G06Q 10/107 709/206 |
| 2011/0137999 A1* | 6/2011 | Amsterdam ........ G06Q 10/107 709/206 |
| 2011/0138000 A1 | 6/2011 | Balasubramanian et al. |
| 2011/0153744 A1 | 6/2011 | Brown |
| 2011/0191693 A1 | 8/2011 | Baggett et al. |
| 2011/0246482 A1* | 10/2011 | Badenes ............ G06F 17/30011 707/748 |
| 2011/0282948 A1* | 11/2011 | Vitaldevara ............ H04L 51/08 709/206 |
| 2012/0296891 A1* | 11/2012 | Rangan ............... G06F 17/3069 707/722 |
| 2013/0024522 A1* | 1/2013 | Pierre .................... G06Q 10/10 709/206 |
| 2013/0054613 A1* | 2/2013 | Bishop ............. G06F 17/30011 707/748 |

FOREIGN PATENT DOCUMENTS

| | | |
|---|---|---|
| JP | 2007-306085 | 11/2007 |
| JP | 2009-069937 | 4/2009 |
| KR | 2010-0108865 | 10/2010 |
| WO | WO-02065316 | 8/2002 |
| WO | WO-2010/144618 | 12/2010 |

OTHER PUBLICATIONS

Knowledge sharing: using searchable email databases; Dublin Institute of Technology Year 2008; http://arrow.dit.ie/scschcomdis/7.

Les Nelson Parc, et al.; Mash Me Up, Mash Me Down: Restructuring Email for Content Sharing and Collaboration in Distributed Teams.

* cited by examiner

EMAIL TAGS

BACKGROUND

Large amounts of institutional knowledge may remain locked in email communications. Not all of this knowledge need be opaque to others though it may remain confidential within the institution. Specifically, due to the private nature of email communication, those not privy to a particular email cannot benefit from the knowledge contained in the email. Additionally, individuals, may find it difficult to locate information within their own email accounts because the emails are not categorized. Moreover, even when some individuals have categorized their emails, the categories across mailboxes of various individuals do not match. For example, the same email may be in different categorical email folders of different people such as "SMB" (i.e., small and medium business), "smallbusiness," "SME" (i.e., small and medium enterprise), or even "MomAndPopBusiness." Considering the preceding, it is difficult for different individuals to arrive at a common terminology of categorization.

Considering institutional stores of information internet or intranet pages such as wikis are inefficient because duplicative effort is required to create such pages and simultaneously communicate or notify others about the content of such pages to the correct parties. Wikis are network pages that can be collaboratively edited in terms of content and structure. Moreover, users must learn a new editing and formatting scheme, which hinders adoption and use.

Mailing lists may help reduce duplicative effort but additional effort is required to create, maintain, and discover mailing lists. By allowing institutions to tap into this vast and valuable information resource, many efficiencies can be gained and productivity can be increased.

BRIEF DESCRIPTION OF THE DRAWINGS

For a more complete understanding of the present disclosure, reference is now made to the accompanying drawings and detailed description.

DETAILED DESCRIPTION

Email a tagging is a system that enables categorization of emails while not requiring users to change their usual workflow of exchanging emails. As such, users will not need to switch cognitive orientations to a separate task when using the tagging system. In accordance with various examples, an "email tag" may be associated with an email during composition or prior to delivery from one person to another. The tag generally comprises a hash symbol with followed by a alphanumeric character string. When an email is composed or sent, the system parses the email for tags. Upon finding tags, the system saves a copy of the malt associated with the tags in a database. The system may also suggest tags based on the contents of the email.

Figure 1:
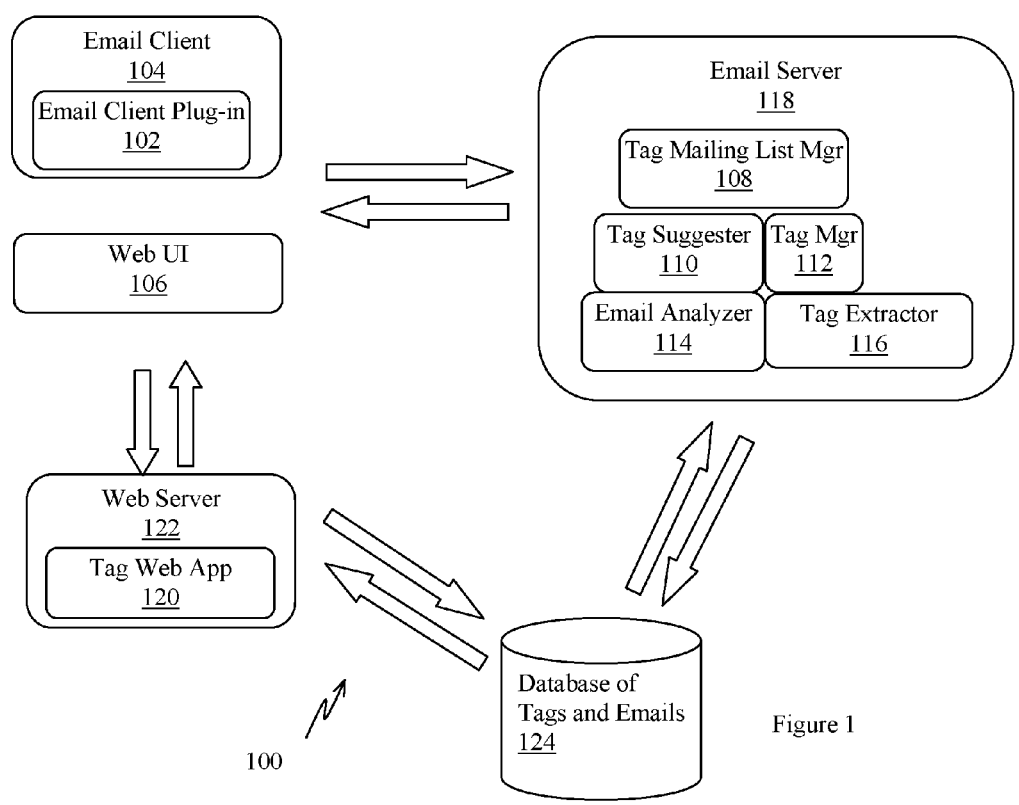
FIG. 1 illustrates a logical representation of a system for suggesting email tags in accordance with at least some illustrated examples.

FIG. 1 illustrates a logical representation of a system 100 for suggesting email tags in accordance with at least some illustrated examples. Email client 104 may implement a graphical user interface ("GUI") that allows a user to interact with the system 100. Specifically, the user may manipulate the GUI to provide input to the system 100 and the system 100 may output to the user through the GUI. The email client 104 may comprise email software such as MICROSOFT OUTLOOK, and the email client plug-in 102 may be an additional set of instructions added to the email client 102 to provide the functionality described in this disclosure. For example the email client plug-in 102 may ado new functions to the email client 104 and allow the user to access the new functions via new menus and buttons on the GUI. The email client 104 may be local to the user or may be web based and accessed through web user interface ("UI") 106. The web user interface 106 may comprise a browser such as INTERNET EXPLORER. The web user interface 106 may access a tag web application 120 remotely. The tag web application may run on a we server 122 and serve multiple users. The web server 122 may be dedicated to the tag web application 120 or may provide other applications or services as well.

The system 100 may also comprise an email server 118 that may include several components or logic such as tagged mailing list manager 108, tag suggester 110, tag manager 112, email analyzer 114, and tag extractor 116. Some or all of the logic may be combined. For example, the tag manager 112 may be combined with the tag suggester 110 logic.

The tag extractor 116 may be logic that detects tags within mails during composition or prior to delivery. A tag may be a string followed or preceded by special character. For example, the hash symbol "#" is a special character. Accordingly, a tag may be "#marketing" to indicate that the email relates to marketing. A tag may appear anywhere in an email. For example, the tag may appear in the subject line or the body of the email. As such, a user may insert a tag into an email simply with the addition of the hash symbol before or after any string in the email. That is, the user may prepend or append the hash symbol to any string appearing the subject or body of the email to create a tag. Adding the hash symbol takes little time or cognitive effort compared to remembering or finding a custom email address in the case of mailing lists or other types of categorization.

The tag extractor 116 may detect the typed hash symbol during composition of the email or anytime before delivery of the email. For example, the tag extractor 116 may periodically check the characters in a draft email for the hash symbol, or the tag extractor 116 may record keystrokes typing the hash symbol during composition of an email. In another example, the tag extractor 118 may detect a hash symbol upon command by the user. For example, the user may select a button to authorize the tag extractor 116 to search the email for the hash symbol. In another example, the user may send the email as authorization to perform tag detection. After sending, but prior to delivery, the tag extractor may search the email for the hash symbol.

Multiple tags may be used in one email, and multiple words may be used in one tag. Hierarchical tags may also be used. For example, one way to implement hierarchical tags is to use periods to denote separate hierarchies: #marketing.smallbusiness, #marketing.printers, #marketing.asia, and the like. The user need not be concerned with whether the tag has been used obviously or not. If the tag has not been previously used, a new to will be created within the system 100 upon first use.

In accordance with some examples, not every email sent within an institution need be tagged. Selecting only emails desired to be shared for tagging is "selective tagging." If selective tagging is desired, a user may mark the email appropriate for sharing among users within the institution by including tags@institution.com in "To" or "CC" fields of the email. Such an email address is not a custom email address marketing@institution.com) because any tag and multiple tags can be used with tags@institution.com and the email address is not the tag.

Tag mailing list manager 108 may be log that associates email addresses of users with tags in a database or other data structure. For example, users may be subscribe to a tag named "#marketing" because they may be interested in viewing institutional information regarding marketing. As such, those users may be able to access emails tagged with the #marketing tag. Additionally, those users may also receive all emails tagged with the #marketing tag in the users' inbox. Users may subscribe to a tag by sending an email only to tags@institution.com with the tags to be subscribed to in the subject or body of the email. Users may be similarly unsubscribed from tags. Multiple tags may be used in the same subscribing or unsubscribing email.

Email analyzer 114 may be logic that parses the content of emails. For example, the analyzer 114 may search for tags in emails by searching for the hash symbol during composition of the entail or prior to delivery. However, the user may prefer to have tags suggested to the user as well. As such, parsing the content may also include determining a subject matter of the email based on at least one critical word in the email. For example, the analyzer 114 may consult a database of critical words, each associated with a tag, and search the email for any of the critical words. Parsing may also include determining the number of times at least one critical word is repeated in the email. Critical words that are repeated are more likely to reflect the subject of the email, especially if they are in the subject field of the email. The critical words may be associated with a weight or hierarchy, some critical words overriding or taking precedence over others regardless of repetition. Critical words may also be defined in the negative, e.g., any word in the email that is not on a blacklist may be a critical word. The blacklist may contain insignificant words or subject-poor words such as articles and prepositions. Parsing the content may also include determining a subject matter of the email based on identity of an intended sender or intended receiver of the email. For example, certain senders or receivers may be more likely to send emails about a particular subject than others may. Also, for tags with an etymology within an institution, similar tags may represent dissimilar subjects depending on the identity of the sender or receiver. For example, within an institution, #display may refer to computer monitors, but #monitor may refer to network monitoring. As such, email analyzer 114 may consult a database or other data structure of personnel and departments when parsing emails. Additionally, email analyzer 114 may use sentence structure and formatting to parse emails. For example, more weight may be given to words associated with exclamation points or formatted with underlining. Combinations of the above examples of parsing may also be used.

Tag suggester 110 may be logic that suggests tags based on the parsed emails during composition of the email or prior to delivery. Tag suggester may take the output of email analyzer 114 and use it as input to output tag suggestions to the user. For example, the tag suggester 110 may suggest tags based on or associated with critical words appearing in the email, based on the identity of the sender or receiver of the email, or based on words or phrases output by the email analyzer 114. Additionally, providing suggestions may include comparing a subject matter of the email to previously generated tags and suggesting tags that compare most favorably. For example, a scoring system may be used where the score indicates the level of favorable comparison. Different elements may adjust the score such as word match, word similarity, and the like. If no previously generated tag compares favorably, for example does not score above a threshold, the suggested tag may be newly generated using the subject matter of the email. Suggested tags may be presented through the web user interface 106 or email client 104 as a menu of choices. The user may select the tags to be associated with the email by selecting one or all of the tags presented. The selected tags are associated with the stored email in a database for future reference. Additionally, the email is delivered to the intended recipient.

Tag manager 112 may be that allows for to creation, tag deletion, and editing of tags. For example, a tag may be created on first use of a hash symbol/string combination appearing in an email. The tag may then be edited by the user or administrator. For example, the tag may require editing due to misspelling, mispointing, and the like. Also tags may be deleted by a user or administrator for efficiency purposes. Tag manager 112 may be accessed through web user interface 106, and may make edits, additions, and deletions to the database of tags, and emails 124. Additionally, tags may be merged, may point to other tags, or may be separated.

The email server 118 may receive the selection of tags and store the email in database of tags and emails 124. For example, the user may click on suggested tags to select them via a popup window in the email client 104. The email server may associate the selected tags with the stored email in the computer database. For example, the email server may link the at least one selected tag with the stored email in the database or another data structure.

The database 124 may be queried through the email client 104 or another program or search window by tag, sender, receiver, or other parameter and may return emails in response to the query. The query need not by submitted by an intended sender or intended receiver of the email. Emails may be published to subscribers of the tags in digest or individual form. The granularity of publishing may be customizable per user. A tag cloud may be created and published to users as well. The tag cloud may list all tags by popularity. The cloud may display the font size of the tag in proportion to the tags popularity. The popularity may be gauged by the quantity or quality of use of the tag. The tags are not email addresses in at least one example, and some tags may be marked as private. Accordingly, the database of tags and mails may be restricted by username and password authentication. Different levels of security may be provided for different tags. For example, an email associated with a #mgmt to may only be returned via query by an officer of an institution. Similarly, some tags may be marked as public.

Figure 2:
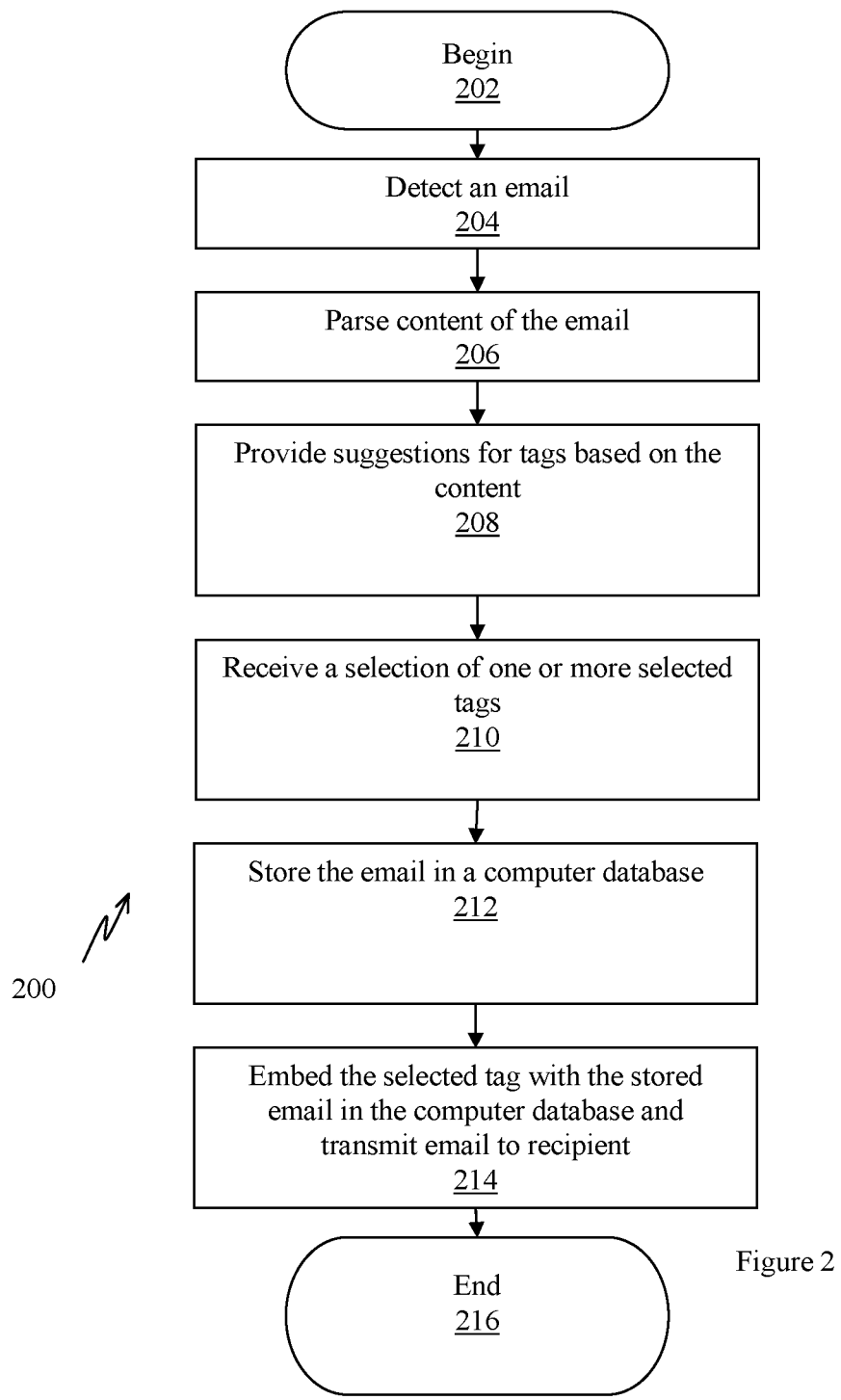
FIG. 2 illustrates a method for suggesting email tags in accordance with at least some illustrated examples.

FIG. 2 illustrates a method 200 for suggesting email tags beginning at 202 and ending at 216 in accordance with at least some illustrated examples. The actions depicted in FIG. 2 may be performed by one or more processors coupled to memory and may by performed in the order shown or in a different order.

At 204, an email in composition is detected. For example, a user may select "create new email" within an email client. Detecting the email may include detecting a bath symbol typed during composition of the email. Detecting the email may also include detecting that the email should be sent. For example, a user may select "send" within an email client. At 206, the contents of the email are parsed. Parsing may include identifying the at least one tag in the subject line or body of the email via a special character. A special character may be a character that is not a letter or as number, and multiple tags may be detected in an email. Parsing may also include determining a subject matter of the email based on at least one critical word in the email, determining the number of times at least one critical word is repeated in the email, or determining a subject matter of the email based on identity of an intended sender or intended receiver of the email.

At 208, tag suggestions are provided based on the contents of the email. Providing suggestions may include comparing a subject matter of the email to previously generated tags and suggesting the tags that compare most favorably. Providing suggestions may also include comparing a subject matter of the email to at least one previously generated tag, and if none compare favorably, generating the at least one suggested tag comprising the subject matter of the email. In at least one example, suggestions are, only provided it the email comprises a predetermined email address listed as a recipient. For example, and email address such as tags@company.com will initiate the tagging process. At 210, a selection of one or more tags selected by the user is received. At 212, the selected email is stored in a computer database. At 214, the tags are associated with the email in the computer database and the email is transmitted to the intended recipient. Associating the tag and email may include linking the tag with the stored email in a database or other data structure. Associating the tag may also include embedding the tag with the stored email in the computer database.

The method 200 may further include providing the stored email in response to a query including the selected tags and publishing the stored email to subscribers of the selected tags.

The examples and mediums described may liberate email communication from opacity into a shared knowledge resource. Users may easily form interest groups, productivity may be improved, and connections between employees with converging interests may be discovered. Accordingly, an organization map of employees and interests may be created. Additionally, a separate email address is not needed for each topic. By using, for example, the hash character in front of words in the subject or body of the email, users avoid having to remember, look up, and type in email addresses such as marketing@institution.com. With, the tagging system only one extra character is needed if the word "marketing" appears anywhere in the email.

Figure 3:
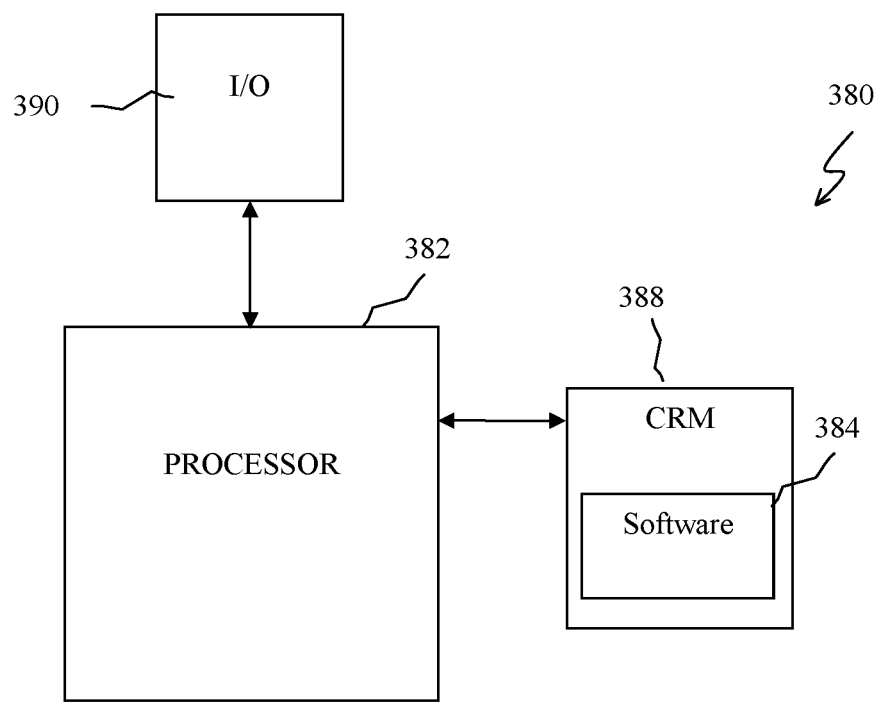
FIG. 3 illustrates a particular machine for suggesting email tags in accordance with at least some illustrated examples.

The examples described above may be implemented on any particular machine or computer with sufficient processing power, memory resources, and throughput capability to handle the necessary workload placed upon the computer. FIG. 3 illustrates a particular computer system 380 suitable for implementing one or more examples disclosed herein. The computer system 380 includes hardware such as a processor 382 (which may be referred to as a central processor unit or CPU) that is in communication with memory devices including storage device 388, and input/output (I/O) 390 devices. The processor may be implemented as one or more CPU chips.

In various examples, the storage device 388 comprises a computer-readable medium such as volatile memory (e.g., RAM), non-volatile storage (e.g., Flash memory, hard disk drive, CD ROM, etc), or combinations thereof. The storage device 388 comprises software 384 that is executed by the processor 382. Software 384 may comprise machine-readable instructions that are executed by hardware processor 382. One or more of the actions described herein are performed by the processor 382 during execution of the software 284.

Figure 4:
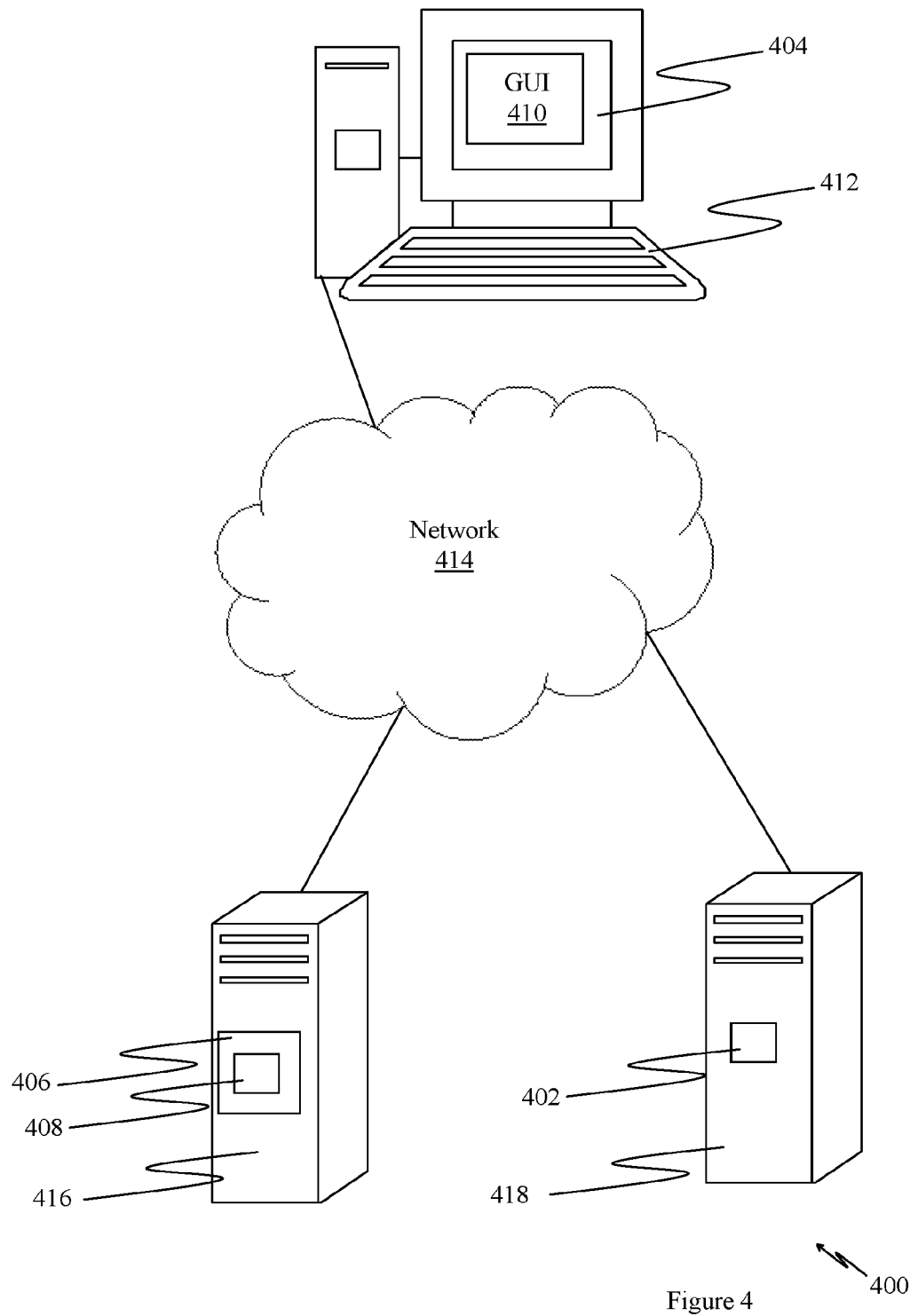
FIG. 4 illustrates a system for suggesting email tags in accordance with at least some illustrated examples.

Turning to FIG. 4, components of a system 400 are distributed over a network 414 in at least one example. Specifically, the user interacts with a graphical user interface ("GUI") 410 displayed on display 404, and transmits information over the network 414 for processing by servers 416, 418. The network 414 may be the Internet or an intranet. Server 418 comprises one or more processors 402 that executes software 408 located on a machine-readable medium 406 of server 416. The system 400 includes a non-transitory machine readable device, medium, or computer-readable medium 406 storing software 408 that, when executed by processors 402, causes the processors 402 to perform or initiate any of the actions described in this disclosure. The processors 402 may be spread over the dent and servers. The GUI 410 may be implemented by a browser or email client, and the GUI 410 is the point of access between the user and the system 400. The processor 402 may be a computer processor, and the computer-readable medium 406 is coupled to the processor 402 in a computer. The display 404 may be a computer monitor, and a user can manipulate the GUI via the keyboard 412 and pointing device or computer mouse (not shown). Many configurations and combinations of distributed computing are possible.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A non-transitory machine-readable storage medium comprising executable instructions that, when executed, cause a processor to:
   analyze an email to determine a subject matter of the email;
   compare the subject matter with a plurality of previously generated tags;
   determine, based on the comparison of the subject matter with the plurality of previously generated tags, whether to provide a newly generated tag that represents the subject matter or at least one of the plurality of previously generated tags;
   when the email comprises a predetermined email address listed as a recipient, provide, based on the determination of whether to provide the newly generated tag or at least one of the plurality of previously generated tags, the newly generated tag or at least one of the plurality of previously generated tags as a suggested tag;
   receive a selection of the suggested tag; and
   store an association between the email and the suggested tag in a computer database.

2. The non-transitory machine-readable storage medium of claim 1, wherein the suggested tag does not comprise an email address.

3. The non-transitory machine-readable storage medium of claim 1, wherein the suggested tag is a private tag.

4. The non-transitory machine-readable storage medium of claim 3, wherein when executed the instructions cause the one or more processors to determine the subject matter of the email based on: identity of an intended sender or intended recipient of the email.

5. The non-transitory machine-readable storage medium of claim 1, wherein when executed the instructions cause the processor to detect a non-alphanumeric character typed during composition of the email.

6. The non-transitory machine-readable storage medium of claim 5, wherein when executed the instructions cause the processor to:
generate, based on the detection of the non-alphanumeric character, a user-generated tag; and
store an association between the email and the user-generated tag in the computer database.

7. The non-transitory machine-readable storage medium of claim 5, wherein detecting the non-alphanumeric character comprises:
recording keystrokes typing the non-alphanumeric character during the composition of the email.

8. The non-transitory machine-readable storage medium of claim 1, wherein when executed the instructions cause the one or more processors to determine the subject matter of the email based on: a critical word in the email or a number of times the critical word is repeated in the email.

9. The non-transitory machine-readable storage medium of claim 1, wherein the suggested tag resides in the body of the email.

10. The non-transitory machine-readable storage medium of claim 1, wherein the suggested tag comprises a previously generated tag that compares most favorably to the subject matter of the email.

11. A method, comprising:
parsing content of an email;
identifying a first tag for the email based on the content by:
determining a subject matter of the email based on the parsing,
comparing the subject matter with a plurality of previously generated tags, and
determining, based on the comparison of the subject matter with the plurality of previously generated tags, whether to identify a newly generated tag that represents the subject matter or at least one of the plurality of previously generated tags as the first tag;
when the email comprises a predetermined email address listed as the recipient, transmitting the email to subscribers of the first tag; and
storing an association between the email and the first tag in a computer database.

12. The method of claim 11, further comprising:
identifying a second tag for the email based on the content; and
subscribing a sender of the email to the first tag and the second tag.

13. The method of claim 11, wherein the first tag resides in the body of the email.

14. The method of claim 11, wherein the first tag is a hierarchical tag.

15. The method of claim 11, wherein identifying the first tag for the email based on the content by:
searching a non-alphanumeric character in the email; and
identifying a string that is prepended or appended to the non-alphanumeric character as the first tag.

16. An apparatus, comprising: a processor; memory coupled to the processor, the memory comprising executable instructions that when executed, cause the processor to:
analyze an email to determine a subject matter of the email;
compare the subject matter with a plurality of previously generated tags;
determine, based on the comparison of the subject matter with the plurality of previously generated tags, whether to provide a newly generated tag that represents the subject matter or at least one of the plurality of previously generated tags;
when the email comprises a predetermined email address listed as a recipient, provide, based on the determination of whether to provide the newly generated tag or at least one of the plurality of previously generated tags, the newly generated tag or at least one of the plurality of previously generated tags as a suggested tag;
receive a selection of the suggested tag; and
store an association between the email and the suggested tag in a computer database.

17. The apparatus of claim 16, wherein comparing the subject matter with the plurality of previously generated tags comprises:
determining a level of favorable comparison between the subject matter and each of the plurality of previously generated tags, wherein the suggested tag comprises a previously generated tag that compares most favorably to the subject matter of the email.

* * * * *